Patented Feb. 17, 1925.

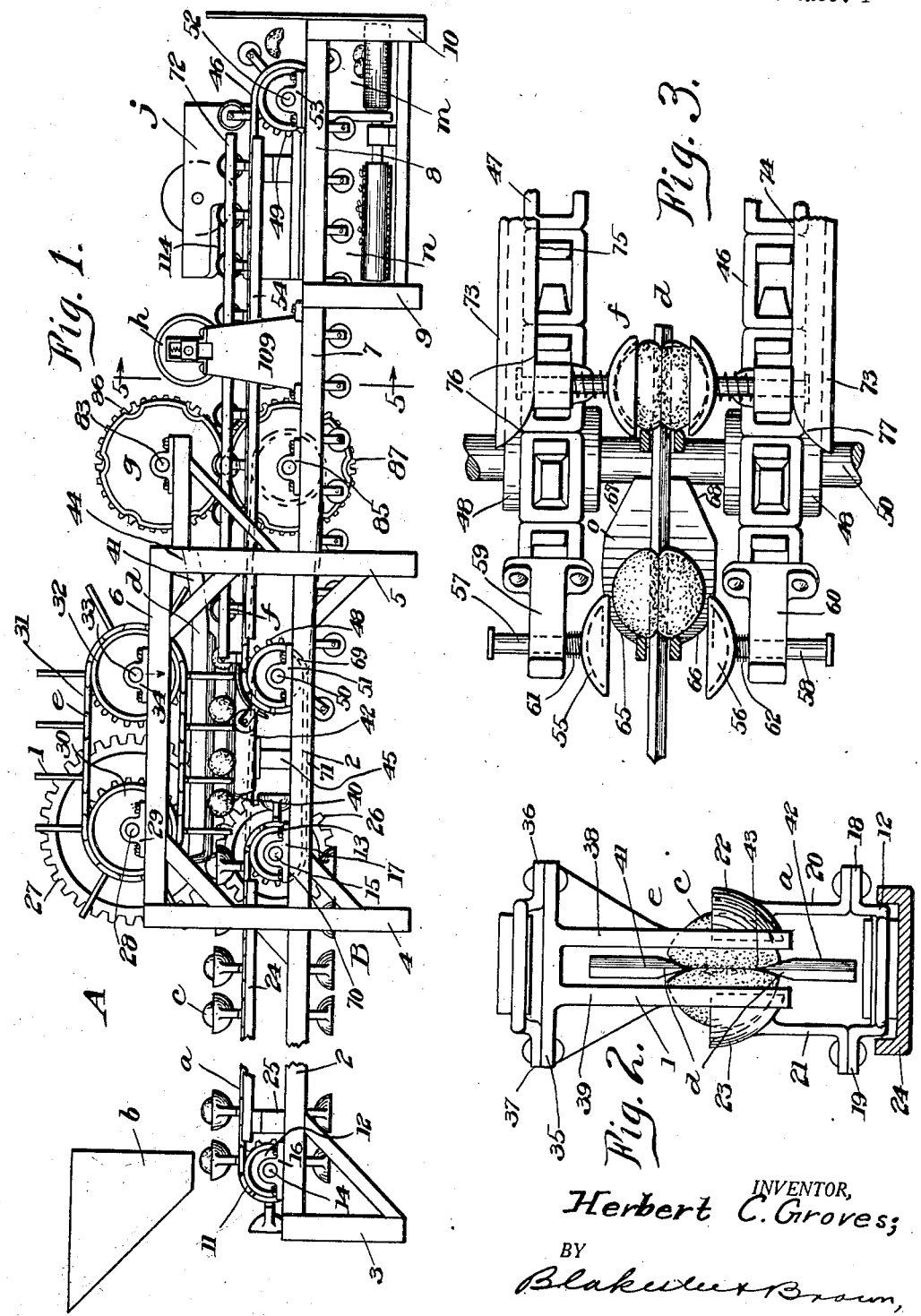

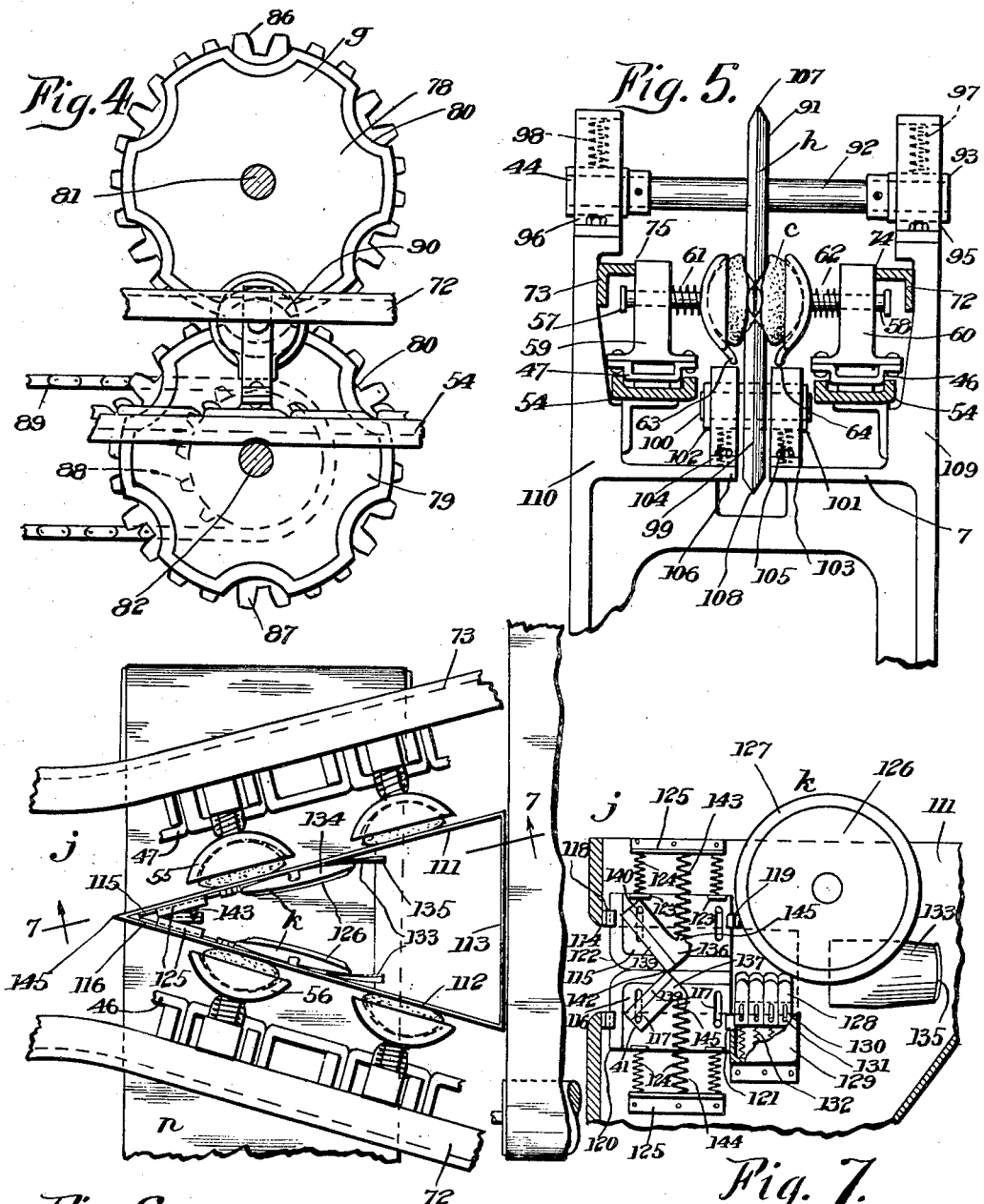

1,526,635

UNITED STATES PATENT OFFICE.

HERBERT C. GROVES, OF LOS ANGELES, CALIFORNIA, ASSIGNOR OF ONE-FOURTH TO JOSEPH SHAPIRO AND ONE-FOURTH TO GEORGE SHAPIRO, BOTH OF LOS ANGELES, CALIFORNIA.

FRUIT PITTER.

Application filed June 15, 1923. Serial No. 645,513.

*To all whom it may concern:*

Be it known that I, HERBERT C. GROVES, a citizen of the United States, residing at Los Angeles, in the county of Los Angeles and State of California, have invented new and useful Improvements in Fruit Pitters, of which the following is a specification.

This invention relates to fruit pitters and has particular adaptability to the removing of pits from fruit such as peaches, apricots and the like. The invention has for an object the provision of a fruit pitter which is positive in its operation, assures removal of the fruit pit without bruising the fruit, which will handle a large volume of fruit, remove the pits therefrom in a minimum of time, and which device is simple, foolproof and not likely to get out of order.

With the above and other objects in view, the invention consists in the novel and useful provision, formation, construction, association and relative arrangement of parts, members and features, all as shown in one embodiment of the accompanying drawing, described generally, and finally pointed out in the claims.

In the drawings:

Figure 1 is a side elevation of the improved device as an entirety;

Figure 2 is an enlarged view of conveyer forks about to engage fruit carried in conveyer pockets or cups for moving the fruit between two knives for initially cutting the fruit;

Figure 3 is a fragmentary top plan view on an enlarged scale of certain features of the device, said view looking down on Figure 1 at the approximate location of the arrow on said figure;

Figure 4 is a fragmentary enlarged elevation of pit knives used in practicing the invention;

Figure 5 is a fragmentary enlarged view of further features of the invention, taken on the line 5—5 of Figure 1 and looking in the direction of the appended arrows;

Figure 6 is a fragmentary enlarged plan view of means for separating the two halves of fruit and in turn removing the pit from said halves; and, Figure 7 is a fragmentary cross sectional view, taken on the line 7—7 of Figure 6, and looking in the direction of the appended arrows.

Corresponding parts in all the figures are represented by the same reference characters.

Referring with particularity to the drawings, wherein I have illustrated one embodiment of the invention and in which A designates as an entirety the improved pit removing machine, *a* is a conveyer adapted to initially receive fruit from a hopper *b* and to conduct the same to a given means for the first cutting operation on any fruit, *c*, said means being designated as an entirety by *d* and *e*, of which means *d* represents knife elements arranged in spaced parallelism, between which knife elements the fruit *c* is adapted to be received, the fruit being moved, as between said knife elements *d* for initial cutting thereof, by the means *e*, which includes a series of propeller units or conveyer forks 1 for positively and in step sequence moving the fruit along said knives and thence the said fruit so initially cut is transmitted from said knives by conveyer means *f*, which means includes two opposed spaced cup members, the cup members during movement of the conveyer *f* bringing the fruit between further knife elements *g*, which elements cut the fruit about the pit, further movement of the conveyer *f* bringing the fruit, now cut into definite halves, between spreader knives *h*, which space the two halves of the fruit *c* with the fruit pit left therebetween until the member *j* is reached, which definitely separates the two parts of the conveyer *f* and positively removes the pit through the means *k* from the two halves to where the fruit halves are deposited on the conveyer means *m*, said pits being deposited on a second conveyer means *n*. We thus have a sequence of operations from the initial placing of fruit *c* on the conveyer *a*, either automatically or by hand, the said fruit *c* being preferably turned by hand by operators to bring the normal seam in the fruit into proper position so that the knife elements *d* will act within the seam, from the first cutting operation to the last operation when the pit is positively removed. All elements of the machine work in approximately the same plane, certain of the elements moving in a definite synchronism to perform the pitting and cutting operation without bruising the fruit and at great speed.

The elements just enumerated are held in a suitable frame-work B, the particular form of the same being immaterial; however, the frame-work includes the usual top frame member 2 supported by legs 3 and 4, the leg 4 being of greater height than the leg 3, as is likewise the leg 5, the means *d* and *e* being carried between said legs 4 and 5 and by a top piece 6 with a further length of said frame B shown at 7 and 8 supported by legs 9 and 10.

The hopper *b* may be conventional in form and adapted to receive fruit to be cut, and automatic means may be installed within said hopper for the purpose of depositing one piece of fruit upon the conveyer *a* at a time. In particular the conveyer *a* includes a continuous chain member 11 passed over sprocket wheels 12 and 13, said sprocket wheels being mounted on shafts 14 and 15, in turn journaled within suitable journal members 16 and 17, said journal members 16 and 17 being carried upon the frame member 2. It is to be understood that the journal members 16 and 17 are arranged in pairs and that Figure 1 illustrates but one side of the machine, the other side so far as the frame is concerned, being identical. The chain member 11 is of the link belt type, as shown in Figure 2, and mounted upon lugs thereof as 18 and 19 are brackets 20 and 21 which carry fruit-carrying elements 22 and 23, which elements together form a cup and might be termed a split cup. It is to be noted upon reference to Figure 2 that the elements are spaced from each other. The chain member 11 is received within a channel guide member 24 which is suitably supported on the top member 2 by a member 25. This guide 24 for the chain prevents any sag in the chain when the cups are carrying any work. Likewise mounted upon the shaft 15 is a gear wheel 26, which in turn is adapted to mesh with a second gear wheel 27, said gear wheel 27 being mounted upon a shaft 28 suitably carried in journal members 29 upon the top member 6. There is also carried on the shaft 28 a sprocket wheel 30 and a chain 31 is adapted to be passed over said sprocket wheel 30 and over a second sprocket wheel 32 carried on a shaft 33, which shaft is journaled in suitable members 34 carried on the tops 6. The chain 31 forming a part of the means *e* carries the conveyer forks or propeller units 1 which are shown in detail in Figure 2, wherein it will be seen that a base portion 35 of said unit 1 is secured to lug portions 36 and 37 of the chain 31 with two members 38 and 39 joined to the base 35. These members 38 and 39 act as propeller units or forks for forcing fruit, as *c*, between the knife elements *d* after the fruit is deposited between said knife elements *d*. It will be seen that the fruit will be received between the knife elements, as the chain 11 carrying the cups passes around the sprocket wheel 13, the fruit *c* being caught between the two knives, as shown at 40. It is to be remembered that the parts 22 and 23 forming the cup are spaced from each other and that the knife elements *d*, of which there are two, are shown at 41 and 42, are ready to engage said fruit, attention being directed to Figure 2 which shows such knife elements *d*. The propeller units or conveyer forks 1 immediately follow behind the fruit and push same along the sharp edges of the two knives. The two members 38 and 39 forming the fork, straddle the two knives 41 and 42, as shown in Figures 1 and 2, and it is to be noted that during movement of the fruit between the two knives the fruit is partially severed along the seam portion at the normal line of jointure between the two halves of the fruit, as shown at 43. Thus the fruit is initially cut. The knife 41 is suitably supported by the leg or legs 5, as shown at 44, while the knife 42 is supported by means of a pedestal member 45 associated with the top members 2. Before said fruit has been moved the entire length of the means *d* the same is engaged by the conveyer means *f* which includes two continuous chain members 46 and 47 passed over sprocket wheels 48 and 49. There are two sprocket wheels 48, as shown in Figure 3 which are spacedly mounted upon a shaft 50 which is carried in journal members 51, supported on the top 2. There are likewise two sprocket wheels 49, each mounted on independent shafts 52 with each shaft carried in suitable bearing members 53 mounted on the top members 8. To prevent sag in the chains 46 and 47 of the conveyer means *f* there are provided carrier guideways 54 for the upper reach or length of each chain. It is very essential to provide these guide-ways so that the fruit carried within the fruit-engaging cups should always be in a definite position when the fruit is acted on by the pit knives *g*, as well as other elements to be described. Upstanding on said chains are opposed cup members 55 and 56, said cups having mounted thereon lugs 57 and 58 carried in brackets 59 and 60, said brackets being respectively carried upon the chains 47 and 46. Between the cups and brackets are springs 61 and 62 which normally urge the cups toward each other. Each cup is formed with a depending lug, as shown in Figure 5 at 63 and 64 and these lugs are adapted to be engaged by a spreader member *o* to separate said cups at a definite point in the movement of the chains 46 and 47.

Referring to Fig. 3 it is to be noted that the spreader *o* is located intermediate the chains 46 and 47 and beneath the knife 42 and that said spreader is provided with cam edges 65, 66, 67 and 68, which edges engage the lugs 63 and 64 spreading the cups apart until the cups are ready to engage the fruit c, whereupon the lugs upon reaching the edges 67 and 68 allow the cups under influence of the springs 61 and 62 to move toward each other and embrace the fruit as shown in Figure 3. To ensure this perfect synchronism of step operations the shaft 50 carries a sprocket wheel indicated by dotted lines at 69, and the shaft 15 likewise carries a sprocket wheel shown by dotted lines at 70, and passed over said sprocket wheels is a continuous chain 71. Thus, as the conveyer a moves the conveyer f will move in step therewith. Guides 72 and 73 are provided for the cup members 55 and 56. These guides ensure that when the fruit is grasped by said cup members the cups will at all times be held in a definite position, it being noted that the pedestals or standards 59 and 60 engage edges as 74 and 75 of said guides, and that the lugs or rods 57 and 58 would be limited as to their inward movement by the ends of the same engaging a portion of said guides. The entering edges 76 and 77 of said guides are curved to insure that the pedestals 59 and 60 will properly engage with said guides. Each lug or rod 57 and 58 is provided with a flanged head to limit movement of said rods within the pedestals in one direction. After the fruit has been engaged by the fruit-engaging cups it is brought between what is termed the knife elements g, which elements include two knives 78 and 79 having formed on their peripheries spaced concavities 80. Shafts 81 and 82 are provided for the knives, the shaft 81 being carried in journal members 83 which are carried on extensions 84, and the shaft 82 is carried within journal members 85 mounted upon the top members 7. A gear 86 is mounted upon the shaft 81 and a second gear 87 is mounted upon the shaft 82, the teeth of the gears being in mesh, as shown in Figure 4. There is also mounted upon the shaft 82 a sprocket wheel 88 and there is carried upon the shaft 50 a sprocket wheel, there being a continuous chain member 89 passed over the sprocket wheel 88 and the sprocket wheel of the shaft 50, whereby the knife elements g may be turned synchronously with movement of the other elements just enumerated. The gears 86 and 87 so rotate the respective knives 78 and 79 that the pocket portions or concavities 80 thereof register as shown at 90. It will be noted that any fruit received within said concavities or pockets 80, it being understood that said pockets are sharpened or brought to an edge, that the fruit will be cut about the pit. It will thus be seen that the fruit has received two initial cuttings, one by the elements d and a further cutting by the elements g. After the fruit carried in the cups has been acted upon by the elements g it is passed between the means h, which means include two knives in the form of discs. The upper knife 91 is carried on a shaft 92, the ends of which shaft are carried in journal boxings 93 and 94 received in guides 95 and 96. These guides 95 and 96 are so arranged as to permit movement of said boxings, and there is mounted within such guides 95 and 96 spring members 97 and 98 at all times pressing downwardly upon said boxings. However, the boxings are allowed an upward movement, depending upon the knife 91 contacting with some hard object. The lower disc member 99 lies in the same plane as and is parallel with the disc 91, and said disc 99 is carried upon a shaft 100 having boxings 101 and 102 received within guide members 103 and 104, there being spring elements 105 and 106 within said guide members at all times exerting an upward movement upon the boxings 101 and 102. Each disc is fairly thick, with the sides beveled to form a knife edge, as shown at 107 and 108. The guides 95 and 96 are carried upon suitable pedestals 109 and 110 associated with the top member 7. The function of said knives is to further cut the fruit and likewise tend to separate the halves of said fruit so as to aid in the disengagement of the pit from such halves. Upon further travel of the chains 46 and 47 the fruit carrying cups bring the fruit to the means j which definitely separates the two halves of the fruit and also ensures removal of the pit or pits of such fruit. The means j is triangular in shape, being approximately an equilateral triangle, having two side members 111 and 112 and a base member 113, the guides 72 and 73 paralleling in spaced relation the sides 111 and 112, as shown in Figure 6. In other words, the said guides 72 and 73 flare outwardly in the zone of the member j. The sides 111 and 112 are recessed as shown in Figure 1 at 114. Attention is directed to Figure 7 which illustrates the side 111 and carried by said side 111 are two opposed knife members 115 and 116, which knife members are provided with slots 117, within which are received pins which are attached to the side 111; adjacent the slot 114 and carried by the member 111 are guides 118 and 119 for the member 115 and guides 120 and 121 for the knife 116. Each knife is curved as shown at 122. Furthermore, each knife carries outstanding lugs or projections 123 and spring members 124 are interposed between such projections 123 and members 125 carried by the side 111. These springs 124 tend to force the knives together, as shown in Figure 7. Immediately behind the knives 115 and 116 are further elements including a disc knife 126, the axle of which is set at an angle, as shown in Figure 6, with the edge beveled, as shown at 127 and slightly in advance of said knife 126 and following the knife 116 is a plurality of spring-pressed fingers 128 mounted within a suitable casing 129 attached to the side 111. Each finger 128 is slotted as shown at 130, with a pin 131 within said slot for limiting play of said fingers within and without said casing 129, there being spring elements 132 within said casing for independently actuating each finger in an outward direction. A spoon 133 is interposed between the sides 11 and the side 134 of the disc, and then bends inwardly as shown at 135. The parts just described for Figure 7 will likewise apply to the side 112 and like reference characters will therefore be applied to the parts on the side 112. Adapted to be interposed between the knives 115 and 116 associated with the sides 111 and 112 are knife elements 136 and 137. These knife elements 136 and 137 are in reality pivoted knife arms having knife edges 138 and 139 with each knife pivoted to a pin 140 and 141, with the ends as 142 resiliently urged together by means of spring members 143 and 144, there being lugs 145 carried by each knife for engaging ends of such springs, the other ends of said springs being associated with the members 125. It will thus be seen that any object received between such knives 136 and 137 will tend to force said knives apart, said knives swinging about their pivot pins 140 and 141.

The operation of the device is as follows:

Assume that the hopper b has been filled with fruit and that suitable power means are provided for turning the shaft 14. This turning of the shaft 14 will through the medium of the chain 11 turn the shaft 15, which shaft upon turning will turn the shaft 50 through the medium of the chain 71, the shaft 50 in turn rotating the shaft 82 through the chain 89, the chains 46 and 47 likewise being moved, as they are associated with a sprocket upon the shaft 50. It thus follows that all parts of the complete apparatus A will be moving in synchronism. As fruit is deposited from said hopper either automatically or manually within the cups of the conveyer a, the fruit is turned by hand so that the seam is upright, and as the cups move the fruit is brought between the knife elements d, said fruit leaving the conveyer a and being moved between said knives for initial splitting of the fruit by the means e, which means includes the propeller units or conveyer forks 1. After this initial cutting of the fruit the fruit is then received within the fruit-receiving pockets or cups 55 and 56 of the conveyer means f and the means f brings the fruit between the knife elements g which elements are the pit knives, so termed for the reason that the fruit is cut about the pit, it being evident that rotation of the two discs forming the knife elements g will completely cut the fruit about the pit of said fruit for the reason that the discs are rotating while the conveyer f is moving therebetween and the rotating movement of the discs plus the travel of the fruit therebetween causes a cutting all around the fruit. From between the said pit knives the fruit is then passed to what is termed the spreader knives h where the parts of the fruit are separated with the pit partially freed from said halves. The pit may cling to one or the other halves of the fruit, but it is in a measure loosened from the fruit. Upon further movement of the conveyor f the two chains 46 and 47 are caused to separate or diverge, said chains previous to such divergence moving in parallelism and the two halves of the fruit are definitely separated with the pit received between the knives 115 and 116. If for any reason the knives 115 and 116 were not sufficient to remove the pit, the pit would be engaged by the knives 136 and 137, and as further assurance in case the pit should cling to one of the halves and not be stripped by the knives 115 and 116, the pit would be engaged by the fingers 128 and the knife 126 which would positively remove the pit. We thus have three different elements for positively removing the pit. The spoon 133 being curved, as shown at 135 would trip the pit and ensure that the said pit would drop downwardly and fall upon the pit conveyer belt n. The two halves of the fruit meanwhile would follow the sides 111 and 112 until they reached the base portion 113, whereupon the halves would drop from the cups and fall upon the belt conveyer m and be conducted elsewhere. In this connection it is to be noted that the conveyers m and n are mounted upon a common shaft which is rotated by suitable means. Said conveyers may constitute belts passed over rollers with the pits and the fruit conveyed to different places for further disposal. It is seen from Figure 6 that the halves of the fruit move along the outer walls of the sides 111 and 112 and are not received within said walls. Likewise it will be observed that the knives 115 and 116 form an apex similar to the apex formed by the jointure of the sides 111 and 112 at the point 145.

It is obvious that various changes and modifications may be made in practicing the invention, in departure from the particular showing, and that said variations and modifications may be made within a fair interpretation of the invention as set forth by the scope of the appended claims.

Having thus disclosed my invention, I claim and desire to secure by Letters Patent:

1. A device of the character disclosed, comprising: a conveyer adapted to initially carry fruit to be cut and have the pits removed therefrom; two spaced parallel knives, the said conveyer bringing said fruit between the knives, and means for passing the fruit along said knives to cut the same; said conveyer including two spaced members adapted to carry fruit, and said knives at a definite zone thereof being in part received between such spaced members.

2. A device of the character disclosed, comprising: a conveyer adapted to initially carry fruit to be cut and have the pits removed therefrom; two spaced parallel knives, the said conveyer bringing said fruit between the knives, and means for passing the fruit along said knives to cut the same; and means including fork members straddling certain of said knives.

3. A device of the character disclosed, comprising: a conveyer adapted to initially carry fruit to be cut and have the pits removed therefrom; two spaced parallel knives, the said conveyer bringing said fruit between the knives, and means for passing the fruit along said knives to cut the same; said means including fork members straddling certain of said knives; there being means for moving the conveyer and the first named means in synchronism.

4. A device of the character disclosed, comprising: a conveyer adapted to initially carry fruit to be cut and have the pits removed therefrom; two spaced parallel knives, the said conveyer bringing said fruit between the knives, and means for passing the fruit along said knives to cut the same; there being conveyer means for grasping the fruit cut by said knives, and means for cutting the fruit about the pit thereof during travel of the last named conveyer means.

5. A device of the character disclosed, comprising: a conveyer adapted to initially carry fruit to be cut and have the pits removed therefrom; two spaced parallel knives, the said conveyer bringing said fruit between the knives, and means for passing the fruit along said knives to cut the same; there being conveyer means for grasping the fruit cut by said knives, and means for cutting the fruit about the pit thereof during travel of the last named conveyer means; said last named means comprising two knife discs formed with a series of concavities, said fruit being received in such concavities.

6. A device of the character disclosed, comprising: a conveyer adapted to initially carry fruit to be cut and have the pits removed therefrom; two spaced parallel knives, the said conveyer bringing said fruit between the knives, and means for passing the fruit along said knives to cut the same; there being conveyer means adapted to grasp the fruit cut by said knives, and means for cutting the fruit about the pit thereof during travel of the last named conveyer means; said last named means comprising two knife discs formed with a series of concavities; there being means for rotating such last named knives during movement of the last named conveyer means.

7. A device of the character disclosed, comprising: a conveyer adapted to initially carry fruit to be cut and have the pits removed therefrom; two spaced parallel knives, the said conveyer bringing said fruit between the knives, and means for passing the fruit along said knives to cut the same; there being conveyer means for grasping the fruit cut by said knives, and means for cutting the fruit about the pit thereof, during travel of the last named conveyer means; said last named means comprising two knife discs formed with a series of concavities, said fruit being received in such concavities; there being fruit spreader means for separating the halves of said fruit to release in part the pit therefrom.

8. A device of the character disclosed comprising: a conveyer adapted to initially carry fruit to be cut and have the pits removed therefrom; two spaced parallel knives the said conveyer bringing said fruit between the knives, and means for passing the fruit along said knives to cut the same; there being conveyer means for grasping the fruit cut by said knives, and means for cutting the fruit about the pit thereof during travel of the last named conveyer means; said last named means comprising two knife discs formed with a series of concavities, said fruit being received in such concavities; there being fruit spreader means for separating the halves of said fruit to release in part the pit therefrom; and means following said fruit spreader means for definitely removing the pit from said fruit.

9. A device of the character disclosed, comprising: a conveyer adapted to initially carry fruit to be cut and have the pits removed therefrom, two spaced parallel knives, the said conveyer bringing said fruit between the knives, and means for passing the fruit along said knives to cut the same; there being conveyer means for grasping the fruit cut by said knives, and means for cutting the fruit about the pit thereof during travel of the last named conveyer means; said last named means comprising two knife discs formed with a series of concavities, said fruit being received in such concavities; there being fruit spreader means for separating the halves of said fruit to release in part the pit therefrom; said fruit spreader means including two spaced disc members provided with knife edges.

10. A device of the character disclosed, comprising: a conveyer adapted to initially carry fruit to be cut and have the pits removed therefrom; two spaced parallel knives, the said conveyer bringing said fruit between the knives, and means for passing the fruit along said knives to cut the same; there being conveyer means for grasping the fruit cut by said knives, and means for cutting the fruit about the pit thereof during travel of the last named conveyer means; said last named means comprising two knife discs formed with a series of concavities, said fruit being received in such concavities; there being fruit spreader means for separating the halves of said fruit to release in part the pit; said fruit spreader means including two spaced disc members provided with knife edges; said disc members being mounted for resilient and relative separation in the same plane.

11. A device of the character disclosed, comprising: a conveyer adapted to initially carry fruit to be cut and have the pits removed therefrom; two spaced parallel knives, the said conveyer bringing said fruit between the knives, and means for passing the fruit along said knives to cut the same; there being conveyer means for grasping the fruit cut by said knives, and means for cutting the fruit about the pit thereof during travel of the last named conveyer means; said last named means comprising two knife discs formed with a series of concavities, said fruit being received in such concavities; there being fruit spreader means for separating the halves of said fruit to release in part the pit; and means following said fruit spreader means for definitely removing the pit from said fruit; said means for definitely removing the pit from said fruit including a triangular shaped member the walls of which are slotted, there being knife elements carried by such walls and adjacent such slots for engagement with the pit.

12. A device of the character disclosed, comprising: a conveyer adapted to initially carry fruit to be cut and have the pits removed therefrom; two spaced parallel knives, the said conveyer bringing said fruit between the knives, and means for passing the fruit along said knives to cut the same; there being conveyer means for grasping the fruit cut by said knives, and means for cutting the fruit about the pit thereof during travel of the last named conveyer means; said last named means comprising two knife discs formed with a series of concavities, said fruit being received in such concavities; there being fruit spreader means for separating the halves of said fruit to release in part the pit; and means following said fruit spreader means for definitely removing the pit from said fruit; said means for definitely removing the pit from said fruit including a triangular shaped member the walls of which are slotted, there being knife elements carried by such walls and adjacent such slots for engagement with the pit; there being further conveyer means for receiving such pits and conveyer means for receiving the halves of the fruit.

In testimony whereof, I have signed my name to this specification in the presence of two subscribing witnesses.

HERBERT C. GROVES.

Witnesses:
J. CALVIN BROWN,
EDNA TURNER.